United States Patent [19]

Yamaguchi

[11] 4,035,080
[45] July 12, 1977

[54] APPARATUS OF SPECTROSCOPY OF SCATTERING LIGHT

[75] Inventor: Takeshi Yamaguchi, Tokyo, Japan

[73] Assignee: Nippon Kogaku K.K., Tokyo, Japan

[21] Appl. No.: 604,656

[22] Filed: Aug. 14, 1975

[30] Foreign Application Priority Data

Aug. 31, 1974 Japan ............................ 49-99498

[51] Int. Cl.² .................. G01N 21/00; G01B 9/02
[52] U.S. Cl. .............................. 356/103; 250/574; 356/75; 356/106 S
[58] Field of Search ......... 356/75, 103, 104, 106 S; 250/574

[56] References Cited

U.S. PATENT DOCUMENTS

| 3,621,220 | 11/1971 | Ford, Jr. ............................ 356/103 |
| 3,835,315 | 9/1974 | Gravitt, Jr. ........................ 356/103 |
| 3,914,055 | 10/1975 | Wolga et al. ...................... 356/75 |

FOREIGN PATENT DOCUMENTS

478,277   1972   Japan ............................... 356/103

OTHER PUBLICATIONS

"A Light Scattering Method for Soot Concentration Measurements"; Dalzell et al., Combustion & Flame; vol. 14, No. 2; 1970; pp. 161, 162.

*Primary Examiner*—Vincent P. McGraw
*Attorney, Agent, or Firm*—Fitzpatrick, Cella, Harper & Scinto

[57] ABSTRACT

Apparatus for spectroscopy of scattering light includes a laser light source, light restricting means for restricting the light scattered by an object, predetermined wavelength selecting means and photon-correlation spectroscopy means for treating the restricted and selected scattering light. This device permits selection of a desired single line of a plurality of spectral lines of the scattering light, and to measure the shape of the spectral line.

5 Claims, 5 Drawing Figures

4,035,080

APPARATUS OF SPECTROSCOPY OF SCATTERING LIGHT

BACKGROUND OF THE INVENTION

Field of the Invention

The present invention relates to spectroscopy, and more particularly, to an apparatus for spectroscopy of scattering light.

Description of the Prior Art

When an object to be examined is illuminated with light incident thereon, decomposition of scattering light from the object into its spectrum enables an investigator to obtain information about the thermodynamic and statistical properties of the object. When incident light is scattered by the object, Rayleigh scattering light, having the same frequency as that of the incident light, and Brillouin scattering light, having a shifted frequency from that of the incident light, can be observed. In order to investigate several properties of the object, it is necessary to observe the intensity of the spectrum, the shift of frequency, and the shape of the spectrum, which are obtained by decomposing the scattering light into its spectrum.

As is illustrated in FIG. 1, a reference numeral 1 is the Rayleigh scattering light which center frequency is the same as that of the incident light $\nu_o$, and reference numeral 2 to 5 are the Brillouin scattering light which center frequencies shift from that of the incident light. As for spectroscopes, a Fabry-Perot interferometer is a spectroscope which directly decomposes light into its spectrum, and light beating spectroscopy electrically treats the light by making use of the beat of the light. Methods for treating signals of light beating spectroscopy include an analogue wave analysis and a digital photon-correlation technique. The Fabry-Perot interferometer has sufficient ability to measure the amount of the frequency shift of Brillouin scattering light, but does not have enough resolution to investigate the shape of each spectral line. Analogue wave analysis for treating signals of light beating spectroscopy may use, for example, a spectrum analyzer when the intensity of scattering light is great enough. However, since the scattering light is generally very weak, the signal which from a photo-multiplier is changed into an electric signal which is a pulse corresponding to photons so that photon-correlation spectroscopy is a suitable method in such cases. Direct data obtained by this photon-correlation spectroscopy method are intensity correlation functions of the scattered light, and when a plurality of spectra exist at the same time, those data are superpositions of the intensity correlation functions of each spectrum, so that it is difficult to separate and correspond it to each spectrum. Accordingly, the Fabry-Perot interferometer was mainly used to measure the amount of the shift of Brillouin scattering light, and the photon-correlation technique was used only to investigate the shape of Rayleigh scattering light when it had sufficient intensity.

SUMMARY OF THE INVENTION

I have conceived and contribute by the present invention an apparatus for spectroscopy of scattering light by which I may select a desired single line of a plurality of spectral lines of the scattering light, and may investigate the shape of that spectral line.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DESCRIPTION OF THE PREFERRED EMBODIMENTS

One embodiment of the invention will be described as follows.

Figure 2:
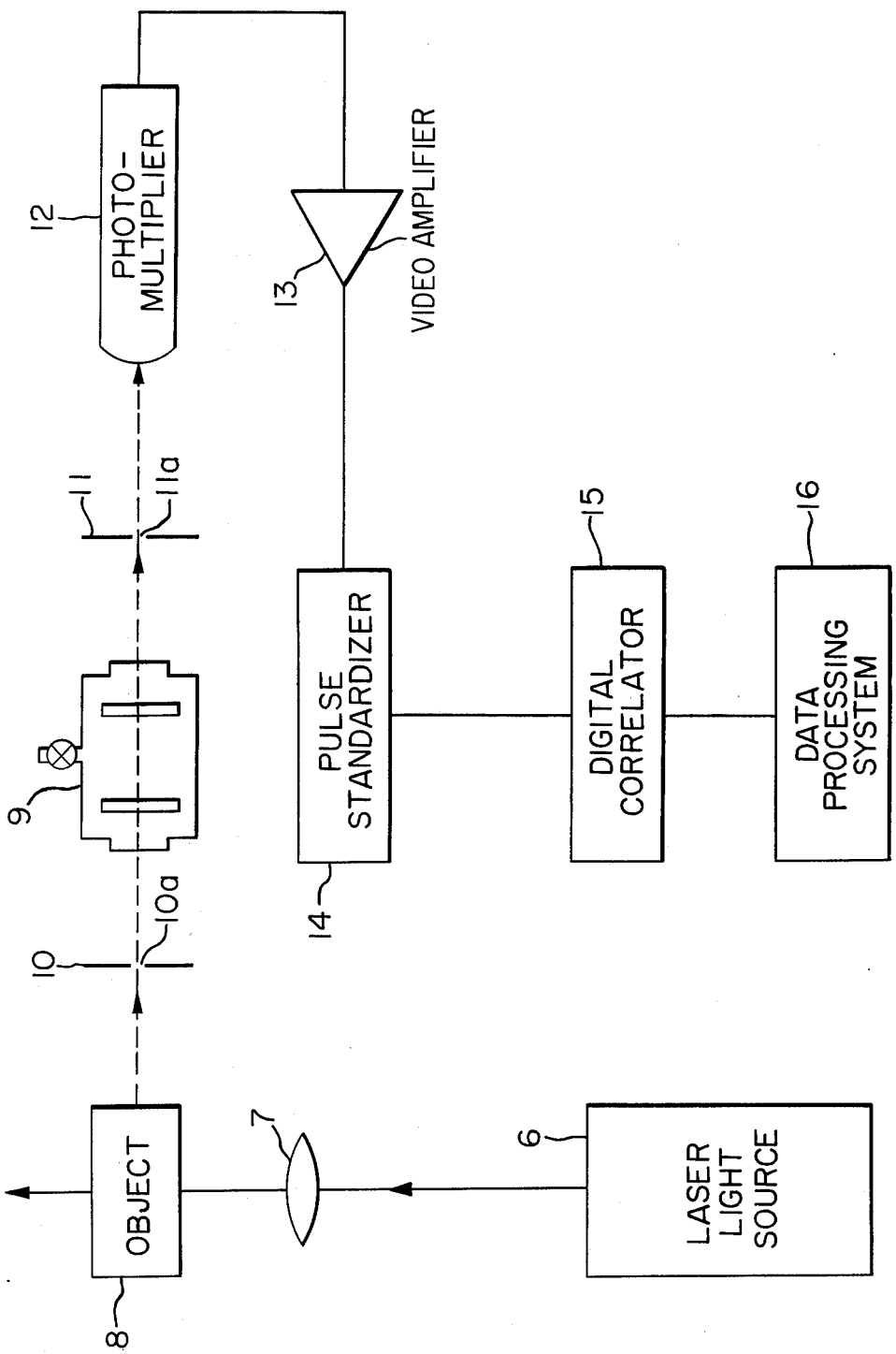
FIG. 2 is a block diagram of one embodiment of this invention.

First, the construction will be explained with reference to FIG. 2 wherein reference numeral 6 designates a continuous wave, single-mode, laser, the intensity of which is as high as possible. Laser light is converged by a lens 7 into a sample cell 8. A scattering light can be observed from such a direction as forms a desired angle with respect to the incident light. A light restricting board 10 having a pinhole 10a and a light restricting board 11 having a pinhole 11a, are provided as shown, and a Fabry-Perot interferometer 9 is positioned between these light restricting boards 10 and 11. Only light having a selected wavelength, which has entered a scanning-type Fabry-Perot interferometer 9 through the pinhole 10a, can pass through the pinhole 11a positioned at the exit side of the Fabry-Perot interferometer 9, and be photoelectrically converted by a photo-multiplier 12. This photo-multiplier 12 has sufficient response characteristics to correspond to the width of a spectrum, and is cooled so as to depress dark noises sufficiently.

Let the diameter of each pinhole 10a and 11a be d1 and d2 respectively, and the distance between these pinholes be $l$. The following coherence condition must be satisfied:

$$d1\, d2 / l < \lambda$$

where $\lambda$ is the wavelength which is observed. The optical axes of the Fabry-Perot interferometer 9 and the pinholes 10a, 11a must of course be sufficiently well aligned. An angle between the detecting system and the incident system is set such that observation may be conviently effected, since the width of the spectrum and the amount of shift vary in response to that angle.

Furthermore, it is more convenient to set these systems on a platform which is freely rotatable.

When the angular dependence of scattering light is measured, to mount only the light restricting boards 10, 11 on an arm on a goniometer and to lead the light having passed through that board 10 to the Fabry-Perot interferometer 9 by using a light guide permits an apparatus to be formed more simply than to mount the photo-multiplier 12 on the goniometer. The light guide however, should be made of the material which causes the light to be transfered without varying the phase of the light (for example, light-converging glass-fiber such as selfoc).

As for the position of the Fabry-Perot interferometer 9 with respect to the pinholes 10a, 11a, besides the position illustrated, the Fabry-Perot interferometer 9 may be positioned before or behind the pinholes 10a, 11a.

The photo-multiplier 12 is cooled to less than −10° C so as to lessen dark noises as much as possible. Since the light that has passed through the pinholes already beats, the density of output pulse from the photo-multiplier 12 that depends on the time corresponds to the intensity of beat of the light. The pulse is amplified by a video amplifier 13 and put into standrdized pulse by a pulse standardizer 14. When a discriminator is put before the pulse standardizer, noises are more effectively removed. The digital correlator is generally of a delay coincidence multi-channel type, but any type can be used if it takes correlation of other digital pulse series.

The signal obtained by this correlator 15 is a correlation function of the intensity of the light. The correlation function and a power spectrum are in relation of Fourier transformation to each other, and the intensity correlation function of the light is a second order correlation function of light field and is in a simple relation to a first order correlation function when a signal obeys a Gaussian process such as scattering light. Therefore, it is easy to obtain a spectrum of the light from the correlation function of the intensity of the light which has been observed. This calculation is effected by a data processing system 16 which may be a minicomputer.

Figure 1:
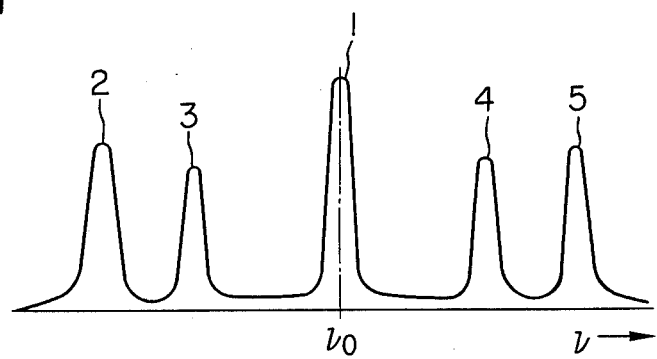
FIG. 1 is one example of spectral lines of a scattering light in which the Rayleigh line and the Brillouin line have about the same intensity.
Figure 3A:
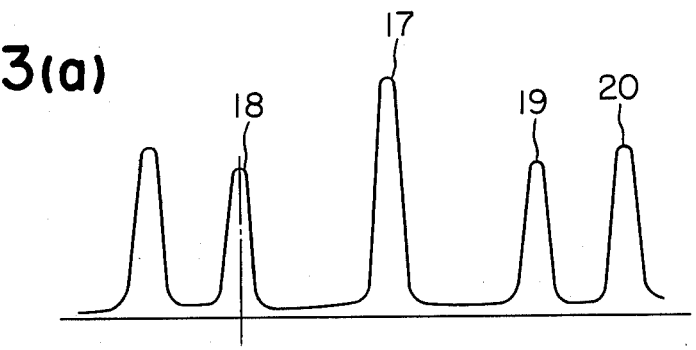
FIGS. 3($a$), 3($b$) and 3($c$) illustrate the manner in which one spectral line is selected out of a plurality of spectral lines of a scattering light by a Fabry-Perot interferometer.
Figure 3B:
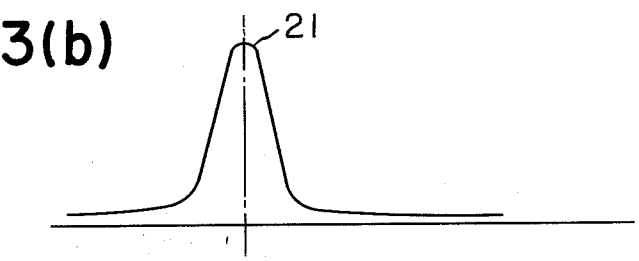
Figure 3C:
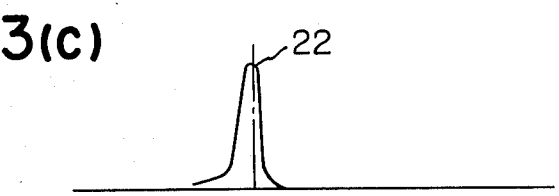

FIGS. 3(a) to 3(c) show the manner in which a single spectral line is taken out of a plurality of spectral lines according to this invention. A letter a designates an example for a spectrum of scattering light, reference numeral 17 refers to a Rayleigh line and reference numerals 18–20 refer to Brillouin lines. In order to know the shape of one of these lines, for example the line 18, the center wavelength of transmission characteristic of the Fabry-Perot interferometer 9 is aligned with the center of the line 18. This is performed as follows. Scanning the Fabry-Perot interferometer 9, an observer watches the output of the photo-multiplier 12 and fixes the photo-multiplier 12 when the maximum intensity appears at that Brillouin line 18. Then if an electric signal of the output is put into a peak-detecting circuit, the position of the peak can be automatically found. Since, in order to decompose into a spectrum by photon-correlation spectroscopy, the spectrum must be symmetrical with respect to the center of selected wavelength of the Fabry-Perot interferometer, both these centers are necessary to be sufficiently aligned.

A reference numeral 21 in FIG. 3(b) is an example of transmittance of the Fabry-Perot interferometer 9 for scattering light and this shows the state in which the Brillouin line 18 is aligned with the center of the selected wavelength of the Fabry-Perot interferometer.

A spectrum obtained by the photon-correlation technique, which has passed through the Fabry-Perot interferometer 9, is like that of reference numeral 22 in FIG. 3(c). $D(\nu)$ which is a spectrum 22 satisfies the relation $D(\nu) = F(\nu) \times S(\nu)$, where $S(\nu)$ is a spectrum of scattering light and $F(\nu)$ is transmittance of the Fabry-Perot interferometer 9.

Since the width of $F(\nu)$ is considerably narrow, in order to know the transmittance $F(\nu)$ of the Fabry-Perot interferometer 9, the light source must be laser light source 6 which has sufficiently narrow width of spectrum compared with the width of $F(\nu)$ and the center of selected wavelength of the Fabry-Perot interferometer 9 is varied, i.e. scanning of the transmittance is effected. Therefore, if $D(\nu)$ is divided by $F(\nu)$, the value of $S(\nu)$ can be obtained.

I believe that the construction and operation of my novel apparatus will now be understood and that the advantages thereof will be fully appreciated by those persons skilled in the art

I claim:

1. A spectroscopic apparatus for measurement of the shape of the Brillouin component in scattered light from an object comprising:
   a. a laser source for illuminating the object;
   b. light restricting means adapted to satisfy a coherence condition for restricting a scattering angle of the scattered light from the object;
   c. means for selecting a single Brillouin component among the plurality of spectrum components in the scattered light;
   d. photo-correlation spectroscopy means for treating said single Brillouin component obtained by said selecting means.

2. A spectroscopic apparatus according to claim 1, wherein said selecting means is a scanning-type Fabry-Perot interferometer having the wavelength range of transmission characteristic nearly equal to that of said single spectrum component.

3. A method for measuring the shape of a single spectrum component in the light which is scattered by an object and which contains a plurality of spectrum components, comprising the steps of:
   applying a laser beam to the object;
   restricting the light scattered by the object to satisfy a coherence condition at a predetermined scattering angle;
   scanning said restricted light over the wavelength range thereof;
   detecting the individual center wavelengths of said plurality of spectrum components in said restricted light;
   selecting a single spectrum component among said plurality of spectrum components in said scattered light according to the detected wavelength; and
   determining the correlation function by performing photon-correlation spectroscopy in respect of said single spectrum component.

4. A method according to claim 3, wherein said selected single spectrum conponent is a Brillouin component.

5. A method according to claim 3, wherein said selecting step comprises transmitting the single spectrum component by filtering means with predetermined transmission characteristic, said method further comprising the step of transforming said calculated correlation function into the correlation function which is independent of said transmission characteristic, to thereby obtain the correlation function according to said detected single spectrum component.

* * * * *